US005305189A

United States Patent [19]

Sekiguchi

[11] Patent Number: 5,305,189

[45] Date of Patent: Apr. 19, 1994

[54] PROJECTOR TYPE LIGHTING DEVICE

[75] Inventor: Tsuneo Sekiguchi, Tokyo, Japan

[73] Assignee: Stanley Electric Co., Ltd., Tokyo, Japan

[21] Appl. No.: 75,034

[22] Filed: Jun. 10, 1993

[30] Foreign Application Priority Data

Jun. 12, 1992 [JP] Japan .............................. 4-46817[U]

[51] Int. Cl.[5] .............................................. B60Q 1/04

[52] U.S. Cl. ..................................... 362/61; 362/297; 362/305; 362/346

[58] Field of Search ................. 362/61, 292, 297, 301, 362/303, 305, 346, 343, 80, 296

[56] References Cited

U.S. PATENT DOCUMENTS

| | | | |
|---|---|---|---|
| 3,953,063 | 8/1990 | Nino | 362/346 |
| 4,918,580 | 4/1990 | Nino | 362/346 |
| 4,922,389 | 5/1990 | Nino | 362/305 |
| 4,928,214 | 5/1990 | Oyama | 362/61 |
| 5,249,110 | 9/1993 | Russello et al. | 362/346 |

*Primary Examiner*—James C. Yeung
*Attorney, Agent, or Firm*—Weingarten, Schurgin, Gagnebin & Hayes

[57] ABSTRACT

A lighting device includes a cutout portion formed at the lower part of a reflective mirror corresponding to a part of the light beam reflected from the reflective mirror and shaded by a shading plate, a first reflective plane consisting of a left-hand reflective plane half and a right-hand reflective plane half for allowing a large part of the light beam emitted directly from the light source to converge in the vertical direction, and a second reflective plane disposed behind the first reflective plane with a vertical attitude for allowing a large part of the light beam reflected from the first reflective plane to be reflected again at the second reflective plane to converge in the vertical direction, to improve a light beam utilizing rate of a light source and light irradiating performances of a projector type lighting device, and moreover, increase a light irradiating intensity of the lighting device. To additionally increase the light irradiating intensity of the lighting device, it is desirable that a third reflective plane is disposed in the form of a concave parabolic surface at the foremost end part of a joint zone between the left-hand reflective plane half and the right-hand reflective plane half of the first reflective plane. It is also desirable that a lens having a certain amount of lens cut is disposed in the form of concave parabolic surface ahead of the first reflective plane and the second reflective plane.

4 Claims, 3 Drawing Sheets

PROJECTOR TYPE LIGHTING DEVICE

BACKGROUND OF THE INVENTION

1. Field of the Invention

The present invention relates generally to a projector type lighting device such as a fog lamp or the like employable for a vehicle. More particularly, the present invention relates to improvement of a projector type lighting device of the foregoing type of which light beam utilizing rate is improved, and moreover, of which light irradiating intensity is substantially increased.

2. Background Art

To facilitate understanding of the present invention, a typical conventional projector type lighting device of the foregoing type will briefly be described below with reference to FIG. 5.

As shown in FIG. 5, a conventional projector type lighting device (hereinafter referred to simply as a lighting device) 90 includes a light source 92 of which lamp filament is located at one focus f of a reflective mirror 91 having a revolving parabolic surface, a composite parabolic surface of the like. In addition, the lighting device 90 includes a projecting lens 93 at the foremost end thereof. As light is generated from the light source 92 and then reflected at the reflective mirror 91, the reflected light is emitted toward the other focus of the reflective mirror 91 at which it converges in the form of a light beam having a substantially circular sectional shape. Since a shading plate 94 is interposed between the reflective mirror 91 and the projecting lens 93, the resultant light beam having a sectional shape corresponding to a semicircle having a lower arc does not contain any upward orienting light component but the lighting device 90 exhibits light distribution properties preferably employable for a light beam to be emitted to a vehicle running in the opposite direction to pass by a vehicle having the lighting device 90 mounted thereon.

With the conventional lighting device 90 constructed in the above-described manner, since all the substantially half of light beam reflected from the reflective mirror 91 is covered with the shading plate 94 to provide the lighting device 90 with the foregoing light distribution properties, a first problem is that a light beam utilizing rate of the light source 92 is reduced to a level of about 50%, resulting in a high degree of illumination corresponding to the quantity of electricity consumed by the light source 92 failing to be obtained with the lighting device 90.

In addition, since light is hardly irradiated to the region located outside of the range defined by the reflective mirror 91, a second problem is that e.g., a road shoulder part located outside of the foregoing range is not illuminated with the light beam emitted from the lighting device 90, and moreover, a person walking ahead of the vehicle in the vicinity of the same is hardly visually recognized by a driver sitting on his seat in the vehicle.

SUMMARY OF THE INVENTION

The present invention has been made in consideration of the aforementioned background.

An object of the present invention is to provide a projector type lighting device for a vehicle which assures that a light beam utilizing rate of a light source can substantially be improved.

Another object of the present invention is to provide a projector type lighting device for a vehicle which assures that a light irradiating intensity can substantially be increased.

Further object of the present invention is to provide a projector type lighting device for a vehicle which assures that light irradiating performances of the lighting device can substantially be improved.

According to one aspect of the present invention, there is provided a projector type lighting device for a vehicle including a reflective mirror having a revolving parabolic surface, a light source located at one focus of the reflective mirror, a shading plate for determining light distributing properties of the projector type lighting device, and a projecting lens located at the foremost end of the projector type lighting device, wherein the projector type lighting device includes a cutout portion formed at the lower part of the reflective mirror corresponding to a part of the light beam reflected from the reflective mirror and shaded by the shading plate; a first reflective plane consisting of a left-hand reflective plane half and a right-hand reflective plane half and disposed below the reflective mirror, the left-hand reflective plane half extending in the leftward horizontal direction along a first cylindrical parabolic surface so as to allow a large part of the light beam emitted directly from the light source to converge in the vertical direction, and the right-hand reflective plane half extending in the rightward horizontal direction along a second cylindrical parabolic surface so as to allow a large part of the light beam emitted directly from the light source to likewise converge in the vertical direction; and a second reflective plane disposed behind the first reflective plane within the area range defined by a certain angle relative to the main irradiating direction of the projector type lighting device based on the light distribution properties of the projector type lighting device and extending along a third cylindrical parabolic surface with a vertical attitude at a right angle relative to the first reflective plane while surrounding the first reflective plane so as to allow a large part of the light beam reflected from the first reflective plane to be reflected again at the second reflective plane to converge in the horizontal direction.

The first cylindrical parabolic surface of the left-hand reflective plane half of the first reflective plane is contoured such that a vertical sectional plane of the first cylindrical parabolic surface taken across the focus of the reflective mirror appears as a parabolic line extending in the leftward horizontal direction with a focus substantially positionally coincident with the focus of the reflective mirror as seen in the main irradiating direction of the lighting device.

Similarly, the second cylindrical parabolic surface of the right-hand reflective plane half of the first reflective plane is contoured such that a vertical sectional plane of the second cylindrical surface taken across the focus of the reflective mirror appears as a parabolic line extending in the rightward horizontal direction with a focus substantially positionally coincident with the focus of the reflective mirror as seen in the main irradiating direction of the lighting device.

In addition, the third cylindrical parabolic surface of the second reflective plane is contoured such that a horizontal sectional plane of the third cylindrical parabolic surface appears as a parabolic line having a focus located in the vicinity of the focus of the reflective mirror as seen from above.

Usually, the axial direction of a line extending through the focus of the parabolic line defining each of the first and second cylindrical parabolic surfaces for the left-hand reflective plane half and the right-hand reflective plane half is coincident or oriented in parallel with the main irradiating direction of the lighting device.

When it is required that a road shoulder part or the like is brightly illuminated with the light beam irradiated from the lighting device, the axial direction of the line extending through the focus of the parabolic line defining each of the first and second cylindrical parabolic surfaces for the left-hand reflective plane half and the right-hand reflective plane half of the first reflective plane is adequately inclined away from the main irradiating direction of the lighting device but toward the road shoulder part or the like.

Usually, the axial direction of a line extending through the focus of the parabolic line defining the third cylindrical parabolic surface of the second reflective plane is oriented at a right angle relative to the main irradiating direction of the lighting device.

Similarly, when it is required that the road shoulder part or the like is brightly illuminated with the light beam irradiated from the lighting device, the axial direction of the line extending through the focus of the parabolic line defining the third cylindrical parabolic surface of the second reflective plane is adequately inclined toward the road shoulder part or the like.

It is recommendable that the angle to be defined for the area range of the second reflective plane relative to the main irradiating direction of the lighting device is set to 60 degrees or less as seen from the front side.

To additionally increase the light irradiating intensity of the lighting device, it is desirable that a lens having a certain amount of lens cut is disposed ahead of the first reflective plane and the second reflective plane.

In addition, according to other aspect of the present invention, there is provided a projector type lighting device for a vehicle including a reflective mirror having a revolving parabolic surface, a light source located at one focus of the reflective mirror, a shading plate for determining light distributing properties of the projector type lighting device, and a projecting lens located at the foremost end of the projector type lighting device, wherein the projector type lighting device includes a cutout portion formed at the lower part of the reflective mirror corresponding to a part of the light beam reflected from the reflective mirror and shaded by the shading plate; a first reflective plane consisting of a left-hand reflective plane half and a right-hand reflective plane half and disposed below the reflective mirror, the left-hand reflective plane half extending in the leftward horizontal direction along a first cylindrical parabolic surface so as to allow a large part of the light beam emitted directly from the light source to converge in the vertical direction, and the right-hand reflective plane half extending in the rightward horizontal direction along a second cylindrical parabolic surface so as to allow a large part of the light beam emitted directly from the light source to likewise converge in the vertical direction; a second reflective plane disposed behind the first reflective plane within the area range defined by a certain angle relative to the main irradiating direction of the projector type lighting device based on the light distribution properties of the projector type lighting device and extending along a third cylindrical parabolic surface with a vertical attitude at a right angle relative to the first reflective plane while surrounding the first reflective plane so as to allow a large part of the light beam reflected from the first reflective plane to be reflected again at the second reflective plane to converge in the horizontal direction; and a third reflective plane disposed at the foremost end of a joint zone between the left-hand reflective plane half and the right-hand reflective plane half of the first reflective plane.

It is desirable that the third reflective plane is contoured in the form a concave parabolic surface.

Structure and a mode of operation of other components constituting the lighting device rather than the third reflective plane are entirely same as those in the lighting device constructed according to the first-mentioned aspect of the present invention. Thus, repeated description will not be required.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DETAILED DESCRIPTION OF THE PREFERRED EMBODIMENTS

The present invention will now be described in detail hereinafter with reference to the accompanying drawings which illustrate a few preferred embodiments thereof.

Figure 1:
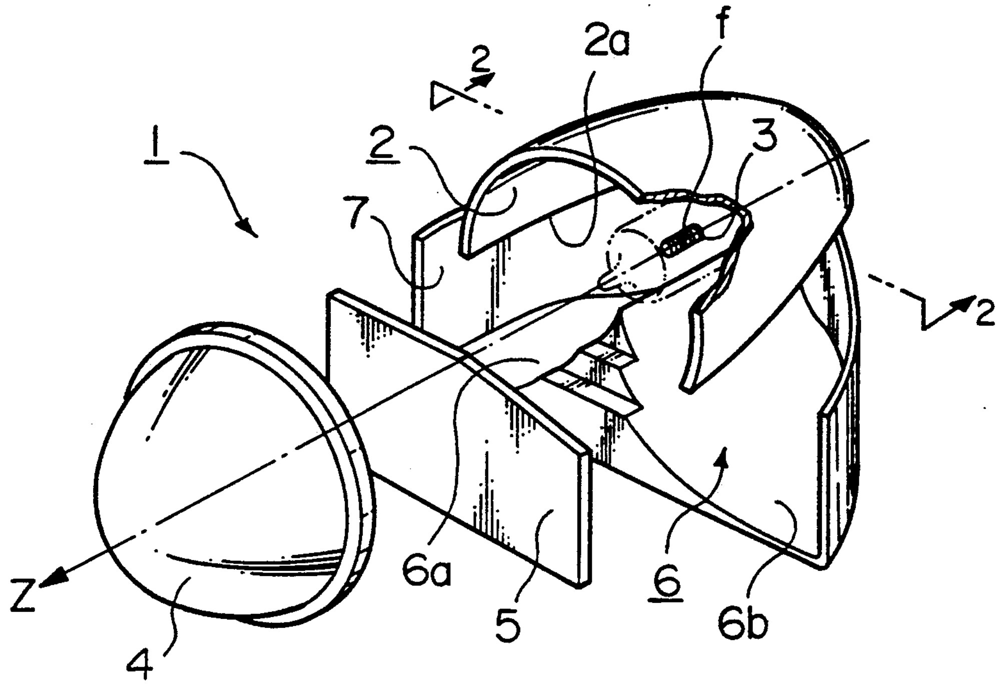
FIG. 1 is a perspective view of a projector type lighting device for a vehicle constructed according to a first embodiment of the present invention, particularly showing essential components constituting the lighting device in the exploded state.

FIG. 1 is a perspective view of a projector type lighting device 1 constructed according to a first embodiment of the present invention. As shown in FIG. 1, the projector type lighting device (hereinafter referred to simply as a lighting device) 1 is composed of a reflective mirror 2 having a revolving parabolic surface, a light source 3 located at a focus f of the reflective mirror 2, a projecting lens 4 disposed at the foremost end of the lighting device 1 for projecting a light beam generated from the light source 3 and then reflected at the reflective mirror 2 with a semicircular sectional shape, and a shading plate 5 interposed between the reflective mirror 2 and the projecting lens 4 for cutting out a part of the reflected light beam unnecessary for determining light distribution properties of the lighting device 1.

The reflective mirror 2 includes a cutout portion 2*a* at the lower part thereof corresponding to the unnecessary part of the reflected light beam shaded by the shading plate 5, and a first reflective plane 6 is formed below the reflective mirror 2 for receiving a part of the light beam adapted to be directly irradiated to the first reflective plane 6 attributable to the formation of the cutout portion 2*a*.

Figure 2:
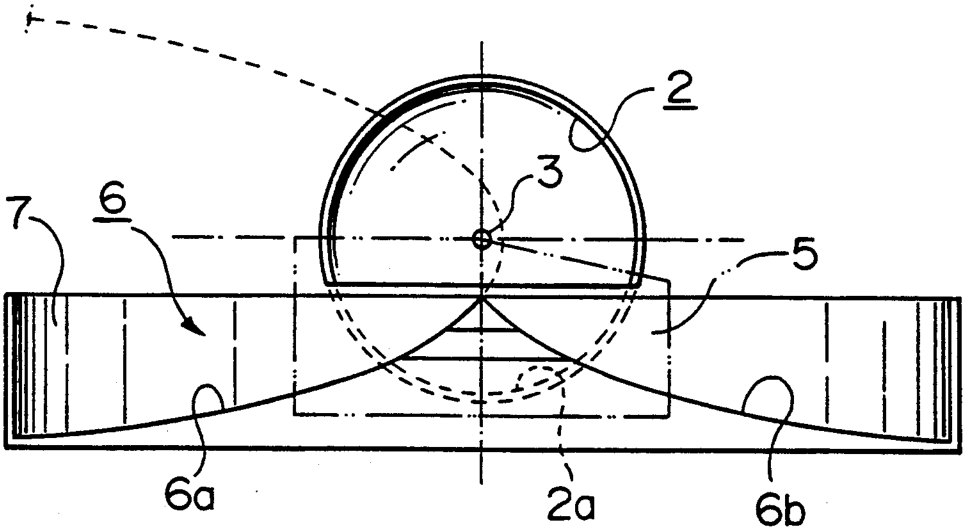
FIG. 2 is a sectional view of the lighting device taken along line A—A in FIG. 1.

As is best seen in FIG. 2, the first reflective plane 6 is composed of a left-hand reflective plane half 6*a* for reflecting a part of the light beam emitted directly from the light source 3 in the leftward horizontal direction at a right angle relative to the main irradiating direction Z of the lighting device 1 and a right-hand reflective plane half 6*b* for reflecting a part of the light beam emitted directly from the same in the rightward horizontal direction.

In detail, the left-hand reflective plane half 6*a* is contoured in the form of a cylindrical parabolic surface of which vertical sectional plane taken across the focus f appears as a parabolic line extending in the leftward direction with a focus substantially positionally coincident with the focus f as seen in the main irradiating direction Z, while the right-hand reflective plane half 6*b* is likewise contoured in the form of a cylindrical parabolic surface of which vertical sectional plane taken across the focus f appears as a parabolic line extending in the rightward direction with a focus substantially positionally coincident with the focus f as seen in the main irradiating direction Z, whereby the first reflective plane 6 composed of the left-hand reflective plane half 6*a* and the right-hand reflective plane 6*b* serves for allowing the light beam emitted directly from the light source 3 to converge in the vertical direction.

Figure 3:
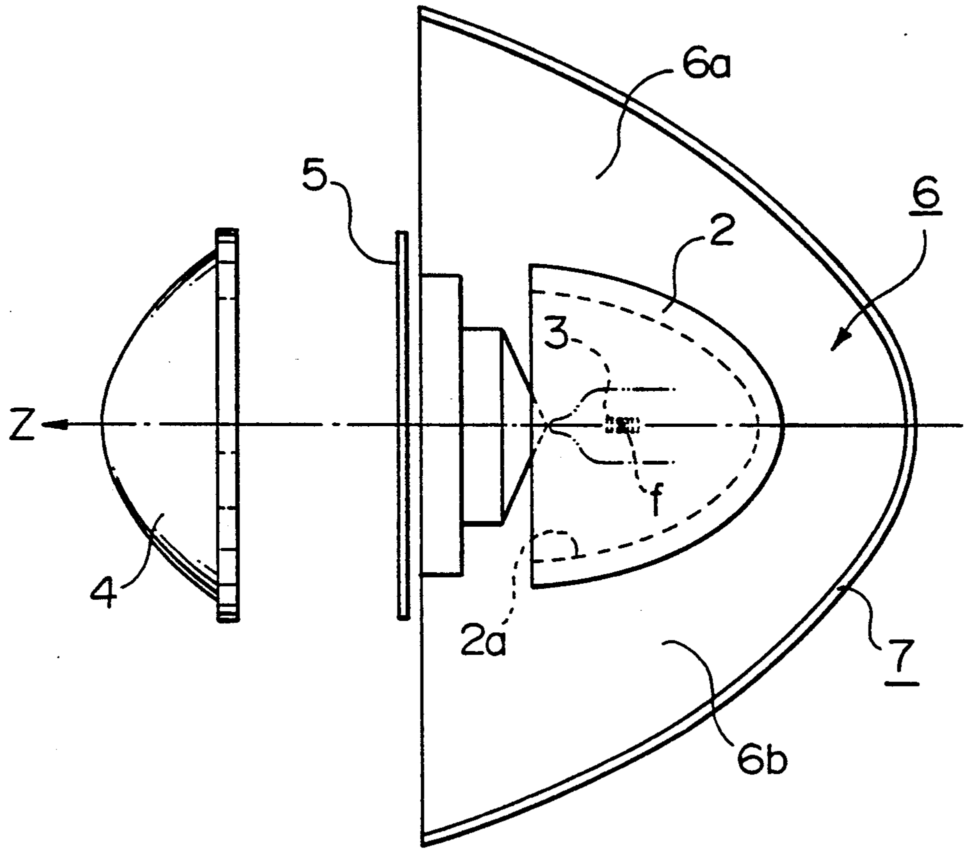
FIG. 3 is a plan view of the lighting device shown in FIG. 1, particularly showing the essential components constituting the lighting device in the partially disassembled state.

In addition to the first reflective plane 6, the lighting device 1 includes a second reflective plane 7 which is located behind the first reflective plane 6 while surrounding the same as shown in FIG. 3. The second reflective plane 7 serves for allowing the light beam reflected from the first reflective plane 6 in the horizontal direction to proceed not only in the sideward direction but also in the rearward direction within the area range defined by an angle of, e.g., 60 degrees relative to the main irradiating direction Z as seen from the front side to be reflected again in the forward direction, causing the reflected light beam to be converted into a useful illuminating light beam.

It should be noted that since a large part of the light beam reflected from the first reflective plane 6 has already converged in the vertical direction before it reaches the second reflective plane 7, there does not arise a substantial necessity for allowing the light beam reflected from the first reflective plane 6 to additionally converge in the vertical direction with the aid of the second reflective plane 7. In the circumstances as mentioned above, the second reflective plane 7 is contoured in the form of a cylindrical parabolic surface of which horizontal sectional plane appears as a parabolic line with a focus located in the vicinity of the focus f of the light source 2 as seen from above, in order to allow the light beam reflected from the second reflective plane 7 to proceed within the foregoing area range to converge in the horizontal direction.

Next, functional and advantageous effects of the lighting device 1 constructed according to the first embodiment of the present invention will be described below.

Specifically, the cutout portion 2*a* is formed at the lower part of the reflective mirror 2 corresponding to a part of the light beam reflected from the reflective mirror 2 and then shaded by the shading plate 5, and moreover, the first reflective plane 6 and the second reflective plane 7 are arranged below the cutout portion 2*a*, whereby a large part of the light beam reflected from the reflective mirror 2 is converted into a light beam to be usefully irradiated in the forward direction. With this construction, it becomes possible to effectively utilize a part of the light beam uselessly shaded by the shading plate 5, resulting in a light beam utilizing rate of the light source 3 being substantially improved.

In addition, a part of the light beam reflected from the first reflective plane 6 to proceed in the horizontal direction is reflected by the second reflective mirror 7 again within the foregoing area range so that the twice reflected light is usefully irradiated in the forward direction via the second reflective plane 7. Thus, the lighting device I makes it possible to variably determine a light irradiation angle thereof in the following manner for the purpose of illuminating, e.g., a road shoulder part with the twice reflected light beam. Consequently, the light irradiating performances of the lighting device 1 can substantially be improved. Incidentally, the additional formation of the first reflective plane 6 and the second reflective plane 7 contributes to remarkable increase of the light irradiating intensity of the lighting device 1, resulting in a vehicle having the lighting device 1 mounted thereon being easily visually recognized by a person walking ahead of the vehicle in the vicinity of the same or a driver sitting on his seat in a vehicle running in the opposite direction.

The first embodiment of the present invention has been described above with respect to the case that the axial direction of a line extending through the focus of the parabolic line defining the cylindrical parabolic surface for each of both the left-hand reflective plane half 6*a* and the right-hand reflective plane half 6*b* of the first reflective plane 6 is coincident with or oriented in parallel with the main irradiating direction Z of the lighting device 1, and moreover, the axial direction of a line extending through the focus of the parabolic line defining the cylindrical parabolic surface for the second reflective plane 7 is oriented at a right angle relative to the main irradiating direction Z of the lighting device 1. Alternatively, the first embodiment of the present invention may be modified in the following manner. Specifically, to variably adjust the light irradiating angle of the lighting device 1 in order to brightly illuminate a road shoulder part or the like with the irradiated light beam, the axial direction of the line extending through the focus of the parabolic line defining the cylindrical parabolic surface for each of both the left-hand reflective plane half 6*a* and the right-hand reflective plane half 6*b* of the first reflective plane 6 is slightly inclined away from the main irradiating direction Z but toward the road shoulder part or the like. Similarly, the axial direction of the line extending through the focus of the parabolic line defining the cylindrical surface for the second reflective plane 7 is slightly inclined in such a manner as to allow the twice reflected light beam to be irradiated toward the road shoulder part or the like.

In addition, it is recommendable that a lens having a certain amount of lens cut is disposed ahead of the first reflective plane 6 and the second reflective plane 7 in order to variably adjust the light distribution properties of the lighting device 1.

Next, a lighting device constructed according to a second embodiment of the present invention will be described below with reference to FIG. 4. It should be noted that same components as those in the first embodiment of the present invention are represented by same reference numerals.

Figure 4:
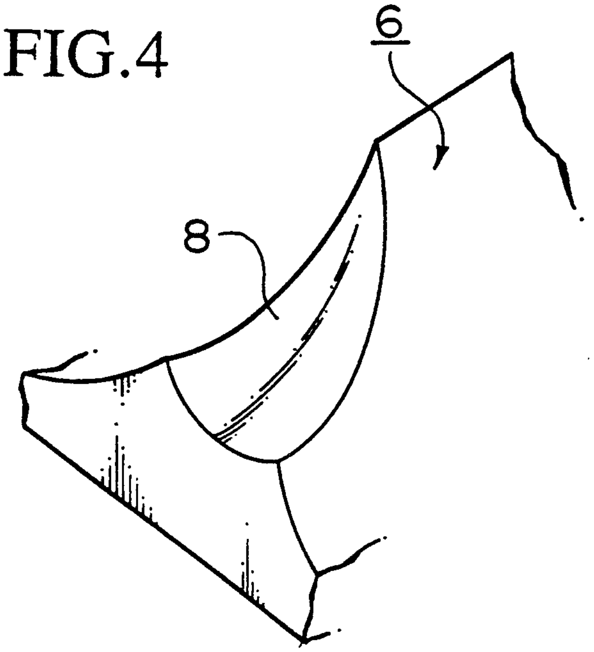
FIG. 4 is a fragmentary perspective view of a projector type lighting device constructed according to a second embodiment of the present invention, particularly showing an essential components constituting the lighting device in the enlarged state.
Figure 5:
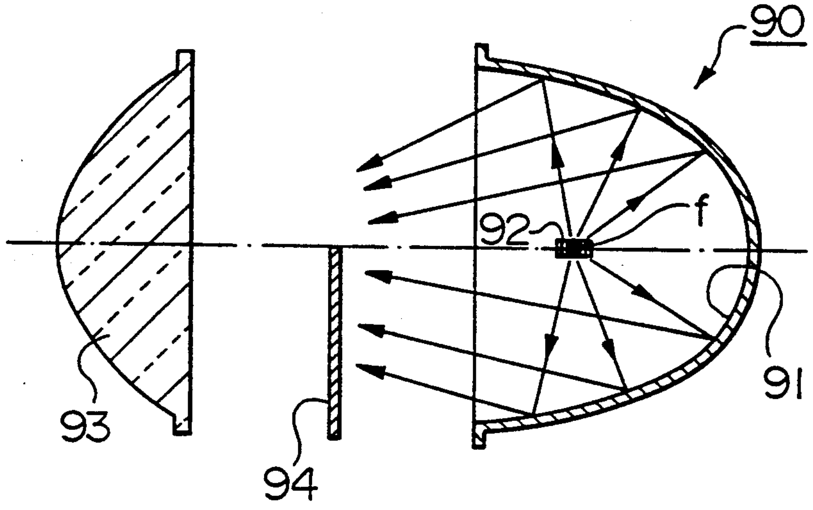
FIG.5 (PRIOR ART)
FIG. 5 is a sectional view of a conventional projector type lighting device.

FIG. 4 is a fragmentary enlarged perspective view of the lighting device 1, particularly showing a joint zone between the left-hand reflective plane half 6a and the right-hand reflective plane half 6b of the first reflective plane 6. In view of the fact that the foregoing joint zone, especially, the foremost end part of the same is shaded by the shading plate 5 in the same manner as the conventional lighting device 90, the lighting device 1 constructed according to the second embodiment of the present invention is intended to effectively utilize a part of the light beam to be shaped by the shading plate 5 in order to improve the light beam utilizing rate of the lighting device 1.

Specifically, a third reflective plane 8 is disposed in the form of a concave parabolic surface at the foremost end part of the joint zone between the left-hand reflective plane half 6a and the right-hand reflective plane half 6b of the first reflective plane 6 in such a manner that a part of the light beam emitted directly from the light source S is reflected at the third reflective plane 8 and then proceeds toward the upper end of the shading plate 5. After the light beam reflected from the third reflective plane 8 reaches the upper end of the shading plate 5, it is converted into a light beam to be usefully irradiated in the forward direction with the aid of the projecting lens 4.

Incidentally, other components rather than the aforementioned ones are entirely same as those in the first embodiment. Thus, repeated description on these components will not be required.

While the present invention has been described above with respect to two preferred embodiments thereof, it should of course be understood that the present invention should not be limited only to these embodiments but various change or modification may be made without departure from the scope of the present invention as defined by the appended claims.

WHAT IS CLAIMED IS:

1. In a projector type lighting device for a vehicle including a reflective mirror having a revolving parabolic surface, a light source located at one focus of said reflective mirror, a shading plate for determining light distribution properties of said projector type lighting device, and a projecting lens located at the foremost end of said projector type lighting device, the improvement comprising;

a cutout portion formed at the lower part of said reflective mirror corresponding to a part of the light beam reflected from said reflective mirror and shaded by said shading plate, a first reflective plane consisting of a lefthand reflective plane half and a right-hand reflective plane half and disposed below said reflective mirror, said left-hand reflective plane half extending in the leftward horizontal direction along a first cylindrical parabolic surface so as to allow a large part of the light beam emitted directly from said light source to converge in the vertical direction, and said right-hand reflective plane half extending in the rightward horizontal direction along a second cylindrical parabolic surface so as to allow a large part of the light beam emitted directly from said light source to likewise converge in the vertical direction, and a second reflective plane disposed behind said first reflective plane within the area range defined by a certain angle relative to the main irradiating direction of said projector, type lighting device based on said light distribution properties of said projector type lighting device and extending along a third cylindrical parabolic surface with a vertical attitude at a right angle relative to said first reflective plane while surrounding said first reflective plane so as to allow a large part of the light beam reflected from said first reflective plane to be reflected again at said second reflective plane to converge in the horizontal direction.

2. The projector type lighting device according to claim 1, wherein said first cylindrical parabolic surface of said left-hand reflective plane half of said first reflective plane is contoured such that a vertical sectional plane of said first cylindrical parabolic surface taken across said focus of said reflective mirror appears as a parabolic line extending in the leftward horizontal direction with a focus substantially positionally coincident with said focus of said reflective mirror as seen in the main irradiating direction of said projector type lighting device.

3. The projector type lighting device according to claim 1, wherein said second cylindrical parabolic surface of said right-hand reflective plane half of said first reflective plane is contoured such that a vertical sectional plane of said second cylindrical parabolic surface taken across said focus of said reflective mirror appears as a parabolic line extending in the rightward horizontal direction with a focus substantially positionally coincident with said focus of said reflective mirror as seen in the main irradiating direction of said projector type lighting device.

4. The projector type lighting device according to claim 1, wherein said third cylindrical parabolic surface of said second reflective plane is contoured such that a horizontal sectional plane of said third cylindrical parabolic surface appears as a parabolic line having a focus located in the vicinity of said focus of said reflective mirror as seen from above.

* * * * *

UNITED STATES PATENT AND TRADEMARK OFFICE

CERTIFICATE OF CORRECTION

PATENT NO. : 5,305,189

DATED : April 19, 1994

INVENTOR(S) : Tsuneo Sekiguchi

It is certified that error appears in the above-indentified patent and that said Letters Patent is hereby corrected as shown below:

Column 6, line 15, "device I" should read --device 1--.

Column 7, line 22, "light source S" should read --light source 3--.

Column 7, line 53, "of a lefthand" should read --of a left-hand--.

Column 8, line 15, "said projecter," should read --said projector-- without the comma.

Signed and Sealed this

Eleventh Day of October, 1994

Attest:

BRUCE LEHMAN

*Attesting Officer*

*Commissioner of Patents and Trademarks*